United States Patent
Shimada et al.

(10) Patent No.: US 7,656,771 B2
(45) Date of Patent: Feb. 2, 2010

(54) OPTICAL PICKUP AND OPTICAL DISC DRIVE

(75) Inventors: Kenichi Shimada, Yokohama (JP); Kunikazu Ohnishi, Yokosuka (JP); Nobuhiro Konuma, Yokohama (JP)

(73) Assignee: Hitachi Media Electronics Co., Ltd., Oshu, Iwate (JP)

( * ) Notice: Subject to any disclaimer, the term of this patent is extended or adjusted under 35 U.S.C. 154(b) by 508 days.

(21) Appl. No.: 11/508,628

(22) Filed: Aug. 22, 2006

(65) Prior Publication Data

US 2007/0223349 A1    Sep. 27, 2007

(30) Foreign Application Priority Data

Mar. 24, 2006    (JP)    ............................. 2006-081885

(51) Int. Cl.
  *G11B 7/00*    (2006.01)
(52) U.S. Cl. ............................. 369/112.16; 369/112.26; 369/110.01; 369/44.11
(58) Field of Classification Search ................. None
  See application file for complete search history.

(56) References Cited

U.S. PATENT DOCUMENTS

| 5,917,798 | A | 6/1999 | Horimai et al. |
| 6,195,315 | B1 | 2/2001 | Takahashi et al. |
| 2004/0252612 | A1 | 12/2004 | Yamasaki et al. |
| 2005/0219988 | A1* | 10/2005 | Atarashi et al. ........ 369/112.08 |
| 2005/0249062 | A1 | 11/2005 | Abe |

FOREIGN PATENT DOCUMENTS

JP    2005-203090    7/2005

OTHER PUBLICATIONS

China Intellectual Property Office (SIPO) office action for SIPO patent application CN2006-101265202 (Aug. 8, 2008).

* cited by examiner

*Primary Examiner*—Muhammad N. Edun
(74) *Attorney, Agent, or Firm*—Townsend and Townsend and Crew LLP

(57) ABSTRACT

An optical pickup for writing information to and/or for reading information from an optical disc having at least two recording layers (dual layer) provided with first and second recording layers can prevent layer crosstalk resulting from disturbing a signal reproduced from the first recording layer by a reflected light beam reflected from the second recording layer during a writing operation for writing information to the first recording layer or a reading operation for reading information from the fist recording layer. An orthogonal polarization region forming component forms an orthogonal polarization region, in which respective directions of polarization of a first light beam focused on and reflected by a first recording layer of an optical disc and a second light beam reflected by a second recording layer of the optical disc are perpendicular to each other, in a region, in which the first and the second light beam overlap each other, on a light-receiving surface of a detector. The orthogonal polarization region forming component is a polarization switch for changing the directions of polarization of part or all of the first and the second light beam.

14 Claims, 7 Drawing Sheets

Effective diameter of the objective lens (a)            (b)

Effective diameter of the objective lens (a)          (b)

(a)          (b)

OPTICAL PICKUP AND OPTICAL DISC DRIVE

BACKGROUND OF THE INVENTION

The present invention relates to an optical pickup for reading information from an optical disc having at least two recording layers, and an optical disc drive provided with this optical pickup.

DESCRIPTION OF THE RELATED ART

An optical pickup for writing information to and/or for reading information from an optical disc having a plurality of recording layers (at least two recording layers) on one side thereof is disclosed in, for example, Patent document 1 (p. 10). This known optical pickup is provided with an optical component capable of suppressing the detection of light from the adjacent recording layer by a detector and this optical pickup prevent fluctuation of output signal which is caused by light from the adjacent recording layer. The optical component is provided with a diffracting area for diffracting part of light reflected from the adjacent recording layer when the optical pickup is applied to writing and/or reading information to and/or from an optical disc having a plurality of recording layers on one side thereof.

High-density-recording disc systems of the next generation have been proposed in recent years to record a large amount of information in a high recording density. Those recently proposed high-density-recording disc systems include the Blu ray Disc system (BD system) using a violet laser beam of 405 nm in wavelength, an objective lens of a high numerical aperture (NA) of 0.85 and a recording disc using a 0.1 mm cover layer and the HD DVD system using a violet laser beam of 405 nm in wavelength, an objective lens having a NA of 0.65 and a recording disc using a 0.6 mm cover layer.

BD and HD DVD also have two recording layers on one side as well as digital video disc (DVD). The R&D activities for developing an optical pickup for reading information from BD and HD DVD need to take into consideration the fluctuation of output signal which is caused by light from the adjacent recording layer.

It is important that an optical pickup for writing information to and/or for reading information from an optical disc having at least two recording layers (dual layer) provided with first and second recording layers can prevent the disturbance of a reproduced signal from the second recording layer, namely, layer crosstalk, during a writing to or reading from first recording layer operation. When a servo signal detection system using three beams, namely, a main beam and two sub beams is used, the intensity of the main beam is about ten times larger than the intensities of the sub beams. Therefore, the intensity of the main beam reflected from the second recording layer is unignorably high to the sub beam and hence the main beam reflected from the second layer can be a significant disturbance to the sub beam reflected from the first layer during a writing information to or reading information from first recording layer operation. If the main beam reflected from the second layer falls on a light-receiving surface for receiving the sub beam, the main beam and the sub beam interfere with each other on this receiving surface and an output signal produced on the basis of the sub beam fluctuates.

According to Patent document 1, the fluctuation of the output signal is suppressed by diffracting part of a light beam reflected from the second recording layer of the two-layer disc, namely, a disturbance, to prevent the light beam reflected from the second recording layer of the two-layer disc from falling on the light-receiving surface while information is being written to or being read from the first recording layer of the two-layer disc. However, since the reflected light beam from the first recording layer and the light beam from the second recording layer travel along one and the same optical axis, part of the reflected light beam from the first recording layer which is not desired to be diffracted is also diffracted when the reflected light from the second recording layer is diffracted and, consequently, the intensity of the light beam to be detected drops. When the intensity of the light beam to be detected drops, the quality of an information signal deteriorates.

SUMMARY OF THE INVENTION

The present invention has been made in view of the foregoing problems and it is therefore an object of the present invention to provide an optical pickup for writing information to and/or for reading information from an optical disc having at least two recording layers provided with first and second recording layers, capable of preventing a reflected light beam reflected from the second layer from affecting a reproduced signal or a servo signal while information is being read from the first layer, of preventing the reduction of the intensity of a reflected light beam reflected from the first recording layer and of insuring a satisfactory signal quality. Another object of the present invention is to provide an optical disc drive provided with the optical pickup according to the present invention.

The present invention provides an optical pickup, which radiates a light beam onto an optical disc provided with a first and a second layer and receives the light beam reflected from the optical disc, including: a laser diode; an objective lens for focusing a light beam emitted by the laser diode on the optical disc; a detector for detecting the reflected light beam reflected from the optical disc; and an orthogonal polarization region forming component which forms an orthogonal polarization region, in which respective directions of polarization of a first light beam focused on and reflected by the first recording layer and a second light beam reflected by the second recording layer before or after the first light beam is focused on the first recording layer are perpendicular to each other, in a region, in which the first and the second light beam overlap each other, in a light-receiving surface of the detector.

In the optical pickup according to the present invention, it is preferable that the orthogonal polarization region forming means is a polarization switch for changing the directions of polarization of part or all of the first and the second light beam. Preferably, the polarization switch is placed in an optical path between the objective lens and the detector. In the orthogonal polarization region, the respective directions of polarization of the first and the second light beam are perpendicular to each other.

In the optical pickup according to the present invention, it is preferable that all or part of the polarization switch is a wave plate. Preferably, the wave plate is a half-wave plate that causes a phase difference of $\lambda/2$, where $\lambda$ is the wavelength of the light beam emitted by the laser diode. Preferably, the polarization switch is a wave plate provided with a predetermined pattern. Preferably, the predetermined pattern is a rectangular pattern, a striped pattern or a checkered pattern.

The present invention provides an optical disc drive including: the foregoing optical pickup according to the present invention, a laser diode driving circuit for driving the laser diode, a servo signal generating circuit for generating a focusing error signal and a tracking error signal by using a signal provided by the detector included in the optical pickup; and an information signal reproducing circuit for reproducing information signals recorded in an optical disc.

The present invention provides the reliable optical pickup for writing information to and/or for reading information from an optical disc having at least two recording layers, capable of insuring a satisfactory signal quality, and the optical disc drive provided with this optical pickup.

BRIEF DESCRIPTION OF THE DRAWINGS

These and other features, objects and advantages of the present invention will become more apparent from the following description when taken in conjunction with the accompanying drawings, wherein.

DESCRIPTION OF THE PREFERRED EMBODIMENTS

Figure 1:
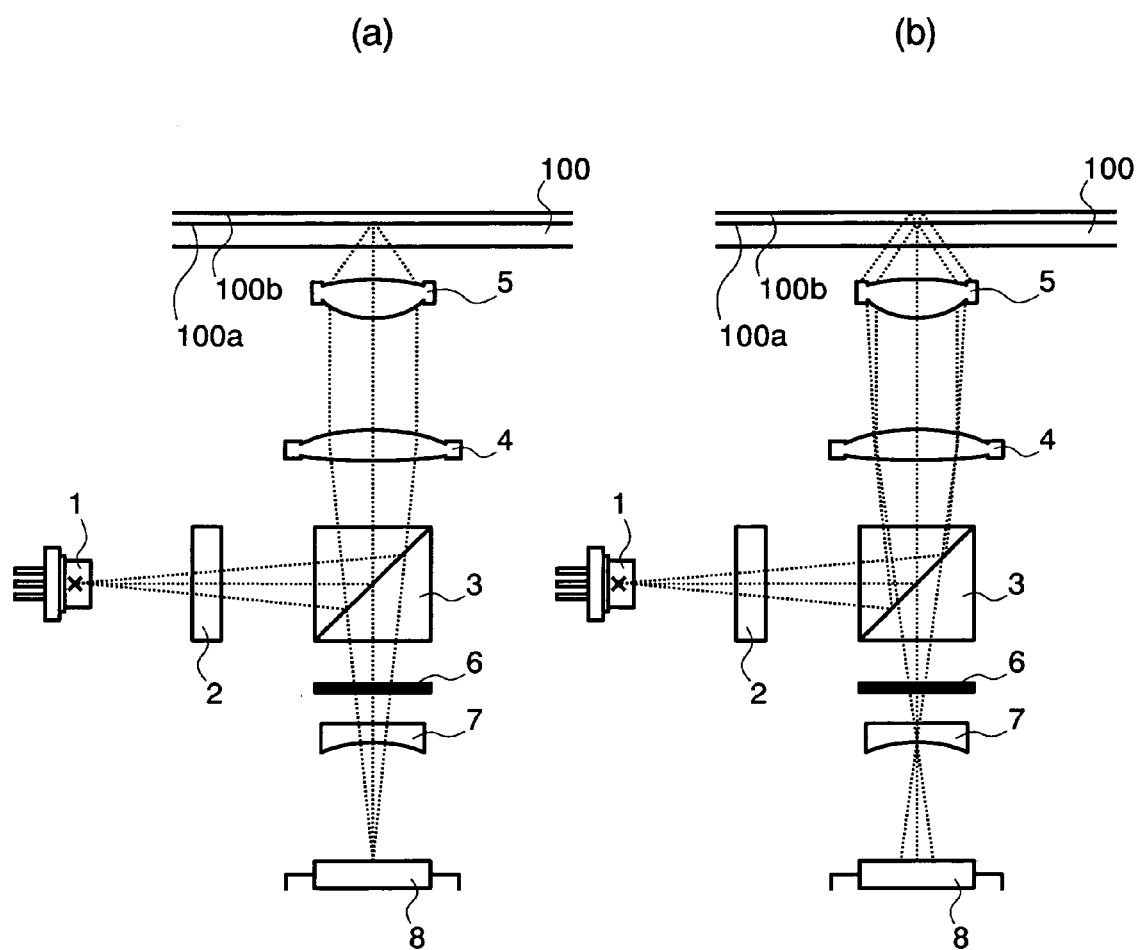
FIG. 1 is a schematic view of the optical system of an optical pickup in a preferred embodiment according to the present invention.

FIG. 1 shows an optical pickup adopting a servo signal detection system in a first embodiment according to the present invention using three beams in a preferred embodiment according to the present invention. Referring to FIG. 1(a), the optical pickup includes, as principal components, a laser diode 1 that emits a light beam of a wavelength λ, an objective lens 5 for focusing the light beam on an optical disc 100, a polarization switch 6 for changing the polarization direction of part or all of the light beam, and a detector 8 for detecting the light beam reflected from the optical disc 100.

A diffraction grating 2 diffracts the light beam of the wavelength λ emitted by the laser diode 1 to provide at least three light beams. A beam splitter 3 reflects the three light beams. The light beams reflected by the beam splitter 3 are collimated in substantially parallel light beams by a collimating lens 4. The objective lens 5 focuses the collimated light beams on the optical disc 100 provided with, for example, two recording layers, namely, a first recording layer 100a and a second recording layer 100b, on one side thereof. The first recording layer 100a overlies the second recording layer 100b.

FIG. 1(a) shows a condition in which the light beams focused on the first recording layer 100a of the optical disc 100 are reflected by the first recording layer 100a. FIG. 1(b) shows a condition in which some part of the light beams focused on the first recording layer 100a of the optical disc 100 and passed through the first recording layer 100a are reflected by the second recording layer 100b. The light beams shown in FIG. 1(a) are used for information reproducing signal detection or servo signal detection and the light beams shown in FIG. 1(b) are disturbances.

The light beams reflected by the first recording layer 100a or the second recording layer 100b reverse the optical path, i.e., the reflected light beams travel through the objective lens 5, the collimating lens 4 and the beam splitter 3 in that order. Light beams passed through the beam splitter 3 travel through a polarization switch 6 for changing directions of polarization of the light beams in a predetermined region. Subsequently, a detecting lens 7 imparts an astigmatism that enables the detection of a focusing error signal by an astigmatic method to the light beams and focuses the light beams on a detector 8.

The optical pickup in this embodiment is capable of suppressing the fluctuation of an output signal due to the interference of the light beams acting as disturbances shown in FIG. 1(b) with the light beams shown in FIG. 1(a) for reproduced signal detection or servo signal detection on the light-receiving surface of the detector 8. When a servo signal is detected by a servo signal detecting method using three light beams, namely, a main beam and two sub beams having intensities far lower than that of the main light beam, the optical pickup is capable of suppressing the fluctuation of the output servo signal due to the interference of the main beam of a comparatively high intensity as a disturbance with the sub beams on the light-receiving surface for detecting the sub beams.

The optical pickup in this embodiment is designed such that the direction of polarization of the light beam shown in FIG. 1(a) for reproduced signal detection or servo signal detection and the direction of polarization of the light beam acting as a disturbance shown in FIG. 1(b) are perpendicular to each other in a predetermined region on the light-receiving surface of the detector 8. Since the optical pickup in this embodiment simply changes the direction of polarization and the intensity of light beam is not reduced by diffraction or the like, a satisfactory signal quality can be insured.

The polarization switch 6 of the optical pickup in this embodiment is placed at a position on an optical path between the beam splitter 3 and the detecting lens 7. The position of the polarization switch 6 is not limited thereto and it is preferable to place the polarization switch 6 at a position on an optical path other than an optical path extending from the laser diode 1 to the optical disc 100. When the polarization switch 6 is placed on an optical path other than the optical path extending from the laser diode 1 and the optical disc 100, the light beam incident on the optical disc 100 is not affected by the polarization switch 6 and signals reflected by the optical disc 100 can be satisfactorily detected.

Figure 2:
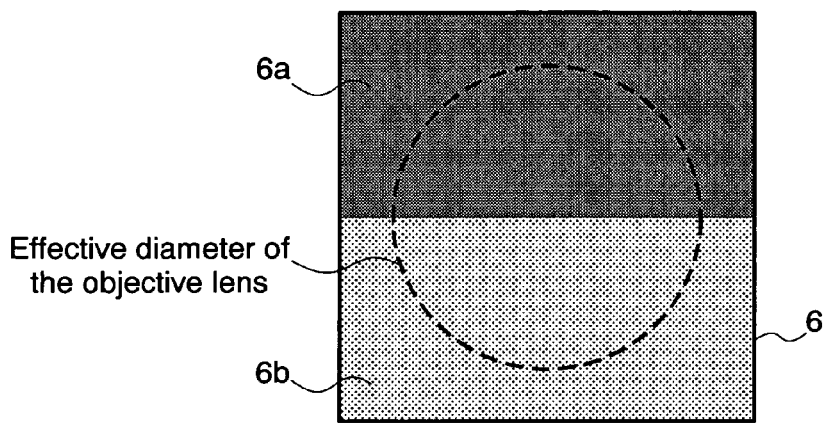
FIG. 2 is a pictorial view of a wave plate pattern in a first example.

Referring to FIG. 2, the polarization switch 6 has a pattern divided into two regions, namely, regions 6a and 6b having the function of a half-wave plate. When a linearly polarized light beam falls on the polarization switch 6, the respective directions of polarization of component light beams passed respectively through the regions 6a and 6b are perpendicular to each other. Both the regions 6a and 6b do not necessarily have the function of a half-wave plate; only either of the regions 6a and 6b may have the function of a half-wave plate, provided that the respective directions of polarization of component light beams passed respectively through the regions 6a and 6b are perpendicular to each other. For example, only the region 6a may have the function of a half-wave plate to turn the polarized light beam through 90° to make the respective directions of polarization of the light beams passed respectively through the regions 6a and 6b perpendicular each other.

Figure 3:
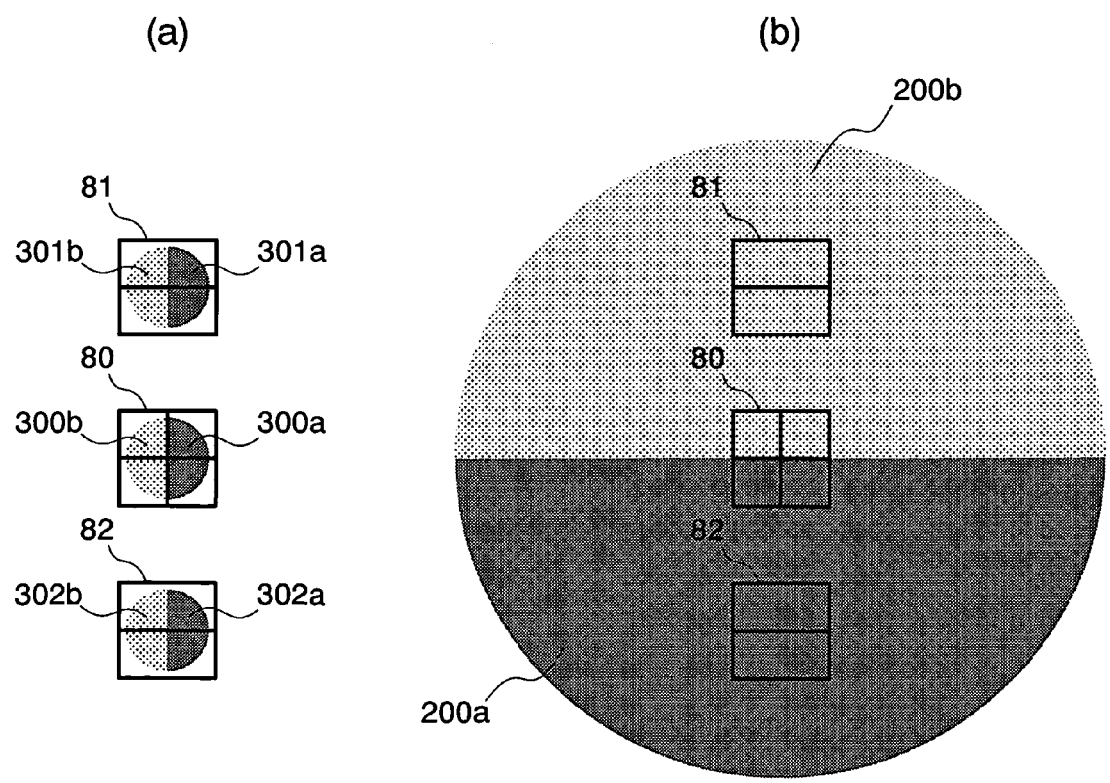
FIG. 3 is a polarization direction distribution pattern in a first example formed by a light beam focused on a light-receiving surface.

When the polarization switch 6 has the wave plate pattern divided into two regions 6a and 6b as shown in FIG. 2, a distribution pattern of polarization of the light beams on the light-receiving surface of the detector 8 corresponds to the pattern of a wave plate as shown in FIG. 3. FIG. 3(a) conceptually illustrates a distribution pattern of polarization when the light beam for reproduced signal detection or servo signal detection is focused on light-receiving surfaces 80, 81 and 82 of the detector 8. FIG. 3(b) conceptually illustrates a distribution pattern of polarization when the light beam acting as a disturbance shown in FIG. 1(b) is focused on the light-receiving surfaces 80, 81 and 82 of the detector 8. The light-receiving surfaces 80, 81 and 82 receive the main beam and the sub beams, respectively. Light spots of the light beam acting as a disturbance formed on the light-receiving surfaces 80, 81 and 82 are greater than light spots of the light beam for reproduced signal detection or servo signal detection formed on the light-receiving surfaces 80, 81 and 82 and cover the light-receiving surfaces 80, 81 and 82 entirely.

Semicircular regions 300a, 301a and 302a on the light-receiving surfaces 80, 81 and 82 shown in FIG. 3(a) are those irradiated with the light beam passed through the region 6a of the polarization switch 6. Semicircular regions 300b, 301b and 302b on the light-receiving surfaces 80, 81 and 82 shown in FIG. 3(b) are those irradiated with the light beam passed through the region 6b of the polarization switch 6. That is, the direction of polarization of the light beam falling on the regions 300a, 301a and 302a and that of the light beam passed through the region 6a of the polarization switch 6 are the same, and the direction of polarization of the light beam falling on the regions 300b, 301b and 302b and that of the light beam passed through the region 6b of the polarization switch 6 are the same. An angular difference between a pattern of the direction of polarization shown in FIG. 3(a) and a pattern of the direction of polarization shown in FIG. 2 is 90° because the optical pickup in this embodiment shown in FIG. 1 imparts an astigmatism that enables the detection of a focusing error signal by an astigmatic method to the light beams by the detecting lens 7 in a direction at about 45° to a dark line on the light-receiving surface. This angular difference is not relevant to the essence of the present invention and hence further description thereof will be omitted.

A semicircular region 200a shown in FIG. 3(b) corresponds to an irradiated region on the light-receiving surface of the detector 8 when the light beam included in the light beam reflected by the second layer 100b and acting as a disturbance to the detection of the reproduced signal or the servo signal reflected by the first layer 100a of the optical disc 100 and passed through the region 6a of the polarization switch 6 shown in FIG. 2. A semicircular region 200b shown in FIG. 3(b) corresponds to an irradiated region on the light-receiving surface of the detector 8 when the light beam included in the light beam reflected by the second layer 100b and acting as a disturbance and passed through the region 6b of the polarization switch 6. That is, the direction of polarization of the light beam fallen on the region 200a and that of the light beam passed through the region 6a of the polarization switch 6 are the same, and the direction of polarization of the light beam fallen on the region 200b and that of the light beam passed through the region 6b of the polarization switch 6 are the same. In FIG. 3, only the main light having the highest intensity is illustrated as a disturbance for convenience.

The direction of polarization of the light beam ir-radiating light regions shown in FIGS. 3(a) and 3(b) and that of the light beam irradiating dark regions shown in FIGS. 3(a) and 3(b) are perpendicular to each other. Therefore, regions in which a light and a dark region overlap each other are irradiated with both the light beams respectively having directions of polarization perpendicular to each other. As obvious from the comparative examination of a distribution pattern of polarization on the light-receiving surfaces of the detector 8, the direction of polarization of the light beam for reproduced signal detection or the servo signal detection can be perpendicular to the direction of polarization of the light beam acting as a disturbance in at least half the regions. For example, the light beam for reproduced signal detection or servo signal detection passed through the region 6a of the polarization switch 6 and the light beam acting as a disturbance passed through the region 6b of the polarization switch 6 overlap each other in the region 301a on the light-receiving surface 81. Those light beams respectively having the directions of polarization perpendicular to each other are incoherent. Consequently, the output signal will not fluctuate. The optical pickup makes the respective directions of polarization of the light beams perpendicular to each other by the polarization switch 6 shown in FIG. 2. Consequently, the intensity of detected light is not reduced and the fluctuation of the output servo signal due to interference can be suppressed.

Figure 4:
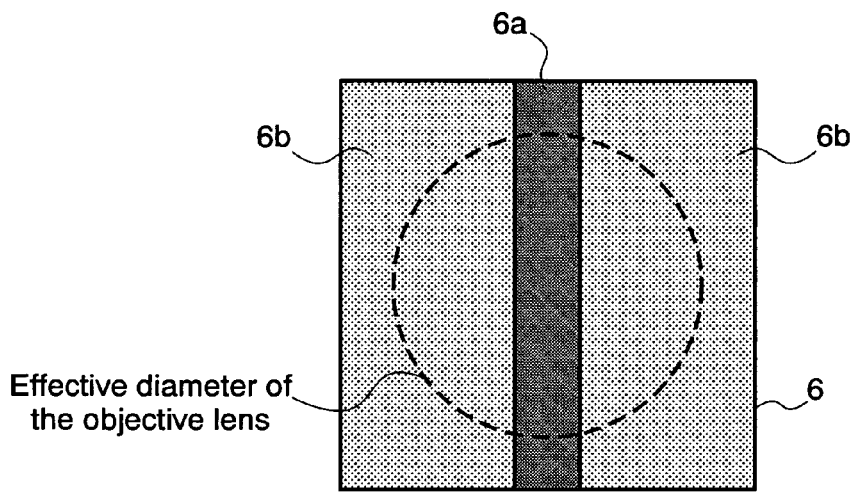
FIG. 4 is a pictorial view of a wave plate pattern in a second example.

An optical pickup in a second embodiment according to the present invention will be described. The wave plate pattern of the polarization switch 6 is not limited to the pattern shown in FIG. 2 and may be, for example, a linear pattern as shown in FIG. 4. The optical pickup in the second embodiment is provided with a polarization switch 6 having a linear pattern like that shown in FIG. 4. The linear pattern shown in FIG. 4 has laterally arranged three regions, namely, a substantially central, rectangular region 6a of a predetermined width and two regions 6b on the opposite sides of the rectangular region 6a. The function of a half-wave plate is imparted to the regions 6a and 6b. When a linearly polarized light beam falls on the polarization switch 6, the respective directions of polarization of light beams passed through the regions 6a and 6b, respectively, are perpendicular to each other.

In this polarization switch 6, the predetermined regions on the light-receiving surface make the respective direction of polarization of a light beam for reproduced signal detection or servo signal detection and a light beam as a disturbance perpendicular to each other, and a region in which the light beams respectively having directions of polarization perpendicular to each other overlap each other can be formed in the largest possible area.

Figure 5:
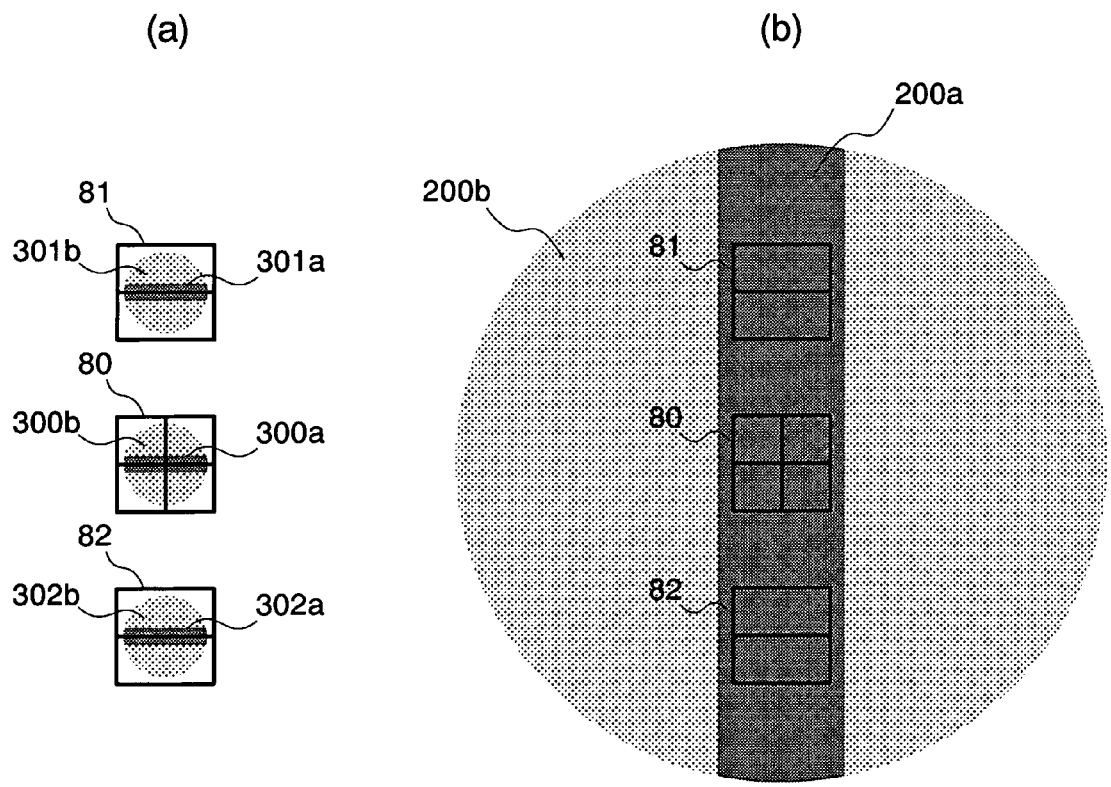
FIG. 5 is a polarization direction distribution pattern in a second example formed by a light beam focused on a light-receiving surface.

From this point of view, the polarization switch 6 is an example of a polarization switch provided with an optimized wave plate pattern 6a. FIG. 5(a) illustrates a distribution pattern of polarization when the light beam for reproduced signal detection or servo signal detection shown in FIG. 1(a) is focused on the light-receiving surfaces 80, 81 and 82 of the detector 8 by the wave plate pattern shown in FIG. 4. FIG. 5(b) illustrates a distribution pattern of polarization when the light beam acting as a disturbance shown in FIG. 1(b) is focused on the light-receiving surfaces 80, 81 and 82 of the detector 8 by the wave plate pattern shown in FIG. 4. The respective directions of polarization of dark parts and light parts shown in FIGS. 5(a) and 5(b) are perpendicular to each other. The polarization switch 6 employed in the second embodiment can form a region in which the respective directions of polarization of the light beams are perpendicular to each other in a large area far greater than that of the region formed by the polarization switch 6 employed in the first embodiment.

Preferably, the region 6a of the polarization switch 6 is formed such that the width of a region 200a shown in FIG. 5(b) is about equal to or greater by a size corresponding to a lens shift of the objective lens than the respective widths of the light-receiving surfaces 80, 81 and 82 of the detector 8. Preferably, the region 6a of the polarization switch 6 is formed such that the width of a light beam acting as a disturbance, passed through the region 6a of the polarization switch 6 and fallen on the light-receiving surfaces 80, 81 and 82 of the detector 8 is about equal to or greater by a size corresponding to a lens shift of the objective lens than the respective widths of the light-receiving surfaces 80, 81 and 82 of the detector 8. When the region 6a is thus formed, regions in which light beams respectively having directions of polarization perpendicular to each other overlap each other can be formed on the light receiving surfaces 80, 81 and 82 of the detector 8 in a large area.

Figure 6:
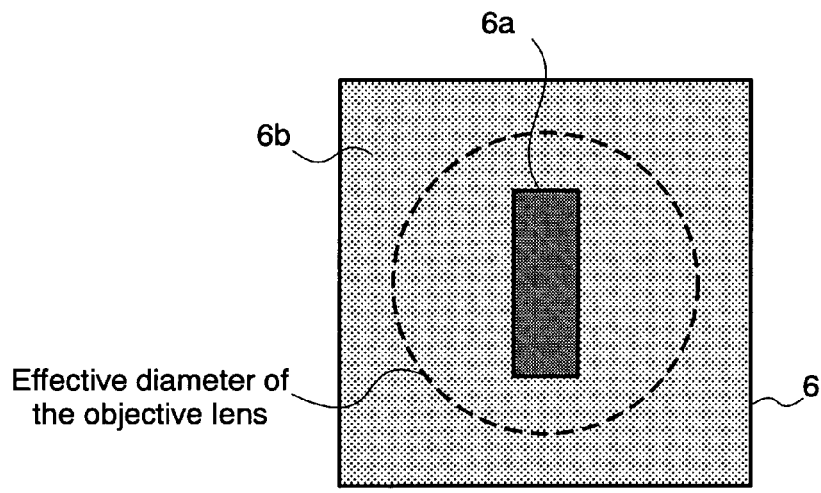
FIG. 6 is a pictorial view of a wave plate pattern in a third example.

An optical pickup in a third embodiment according to the present invention will be described. The optical pickup in the third embodiment is provided with a polarization switch 6 having an optimized rectangular region 6a as shown in FIG. 6. The polarization switch 6 employed in the third embodiment has the substantially central, rectangular region 6a and a region 6b surrounding the rectangular region 6a. The function of a half-wave plate is imparted to the region 6a or 6b such that the respective directions of polarization of a light beam passed through the region 6a and a light beam passed through the region 6b are perpendicular to each other.

Figure 7:
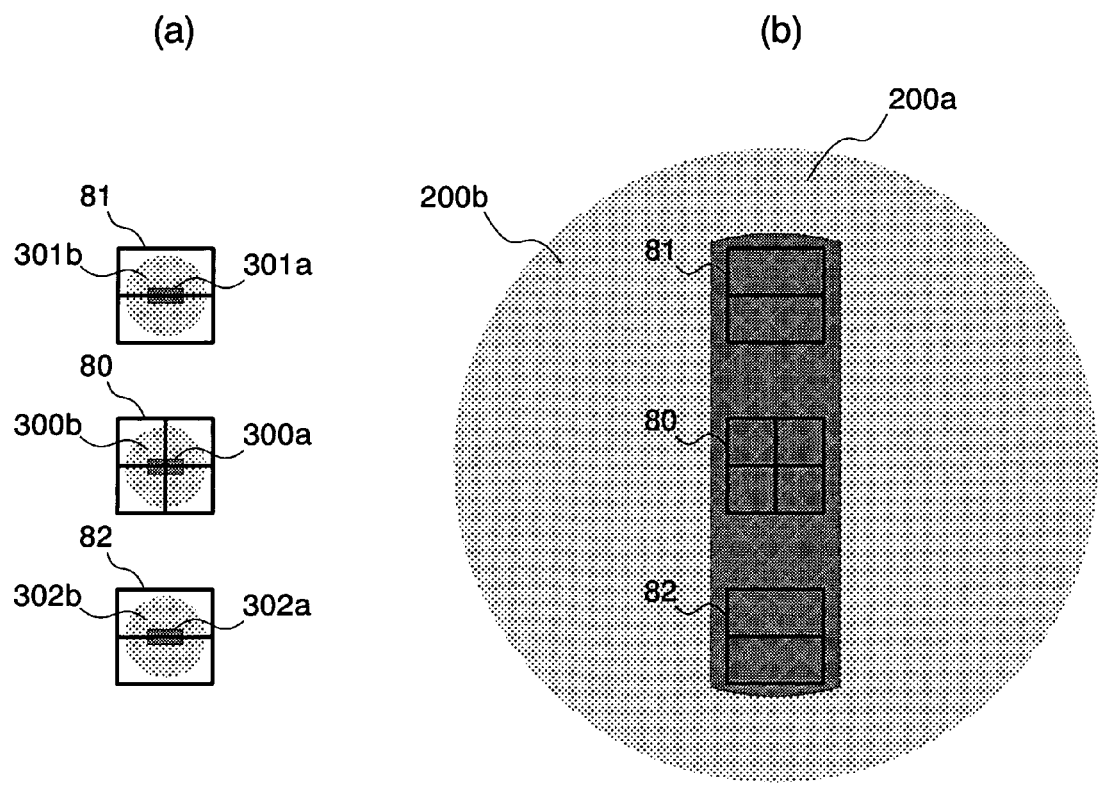
FIG. 7 is a polarization direction distribution pattern in a third example formed by a light beam focused on a light-receiving surface.

FIG. 7(a) illustrates a distribution pattern of polarization when the light beam for reproduced signal detection or servo signal detection shown in FIG. 1(a) is focused on the light-receiving surfaces 80, 81 and 82 of the detector 8 by the wave plate pattern shown in FIG. 6. FIG. 7(b) illustrates a distribution pattern of polarization when the light beam acting as a disturbance shown in FIG. 1(b) is focused on the light-receiving surfaces 80, 81 and 82 of the detector 8 by the wave plate pattern shown in FIG. 6 when the region 6a of the polarization switch 6 has the pattern shown in FIG. 6.

The direction of polarization of the light beam irradiating light regions shown in FIGS. 7(a) and 7(b) and that of the light beam irradiating dark regions shown in FIGS. 7(a) and 7(b) are perpendicular to each other. Therefore, the polarization switch 6 employed in the third embodiment can form a region in which the respective directions of polarization of the light beams are perpendicular to each other in a large area greater than that of the region formed by the polarization switch 6 employed in the second embodiment.

The wave plate pattern in the third embodiment is not limited to a rectangle and may be a rhombus, a parallelogram or a polygon.

An optical pickup in a fourth embodiment according to the present invention will be described. The optical pickup in the fourth embodiment has a striped wave plate pattern as shown in FIG. 8.

FIG. 9(a) illustrates a distribution pattern of polarization when the light beam for reproduced signal detection or servo signal detection is focused on the light-receiving surfaces. FIG. 9(b) illustrates a distribution pattern of polarization of the light beam acting as a disturbance. The direction of polarization of the light beam irradiating light regions shown in FIGS. 9(a) and 9(b) and that of the light beam irradiating dark regions shown in FIGS. 9(a) and 9(b) are perpendicular to each other. Therefore, although the polarization switch 6 employed in the fourth embodiment forms a region in which the respective directions of polarization of the light beams for reproduced signal detection or servo signal detection and the beam acting as a disturbance are perpendicular to each other in a small area, the polarization switch 6 has a low sensitivity to the performance-deteriorating effect of its horizontal dislocation as viewed in FIG. 8.

Figure 8:
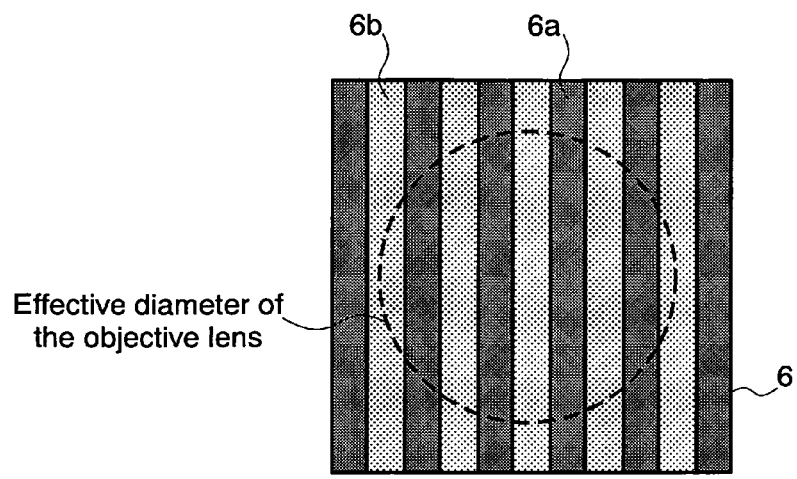
FIG. 8 is a pictorial view of a wave plate pattern in a fourth example.
Figure 9:
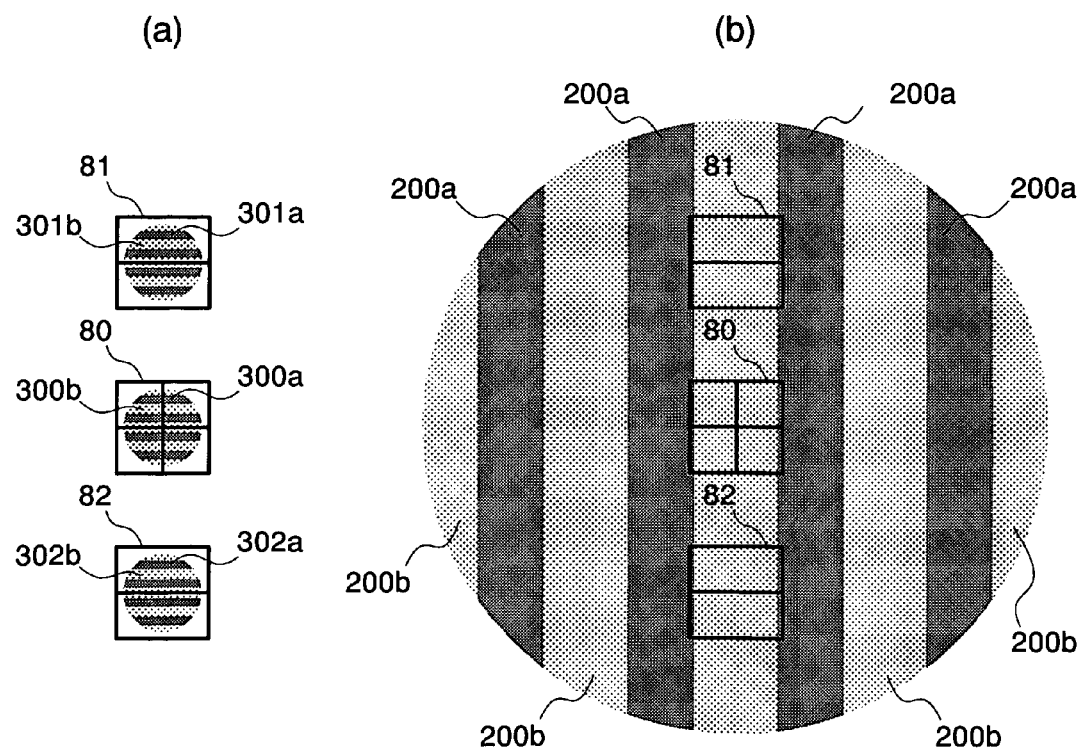
FIG. 9 is a polarization direction distribution pattern in a fourth example formed by a light beam focused on a light-receiving surface.

The stripes do not need to be arranged at intervals shown in FIG. 8 and may be arranged at shorter intervals. Arrangement of the stripes at shorter intervals lowers the sensitivity of the polarization switch 6 to the performance-deteriorating effect of its horizontal dislocation, as viewed in FIG. 8, still further.

Figure 10:
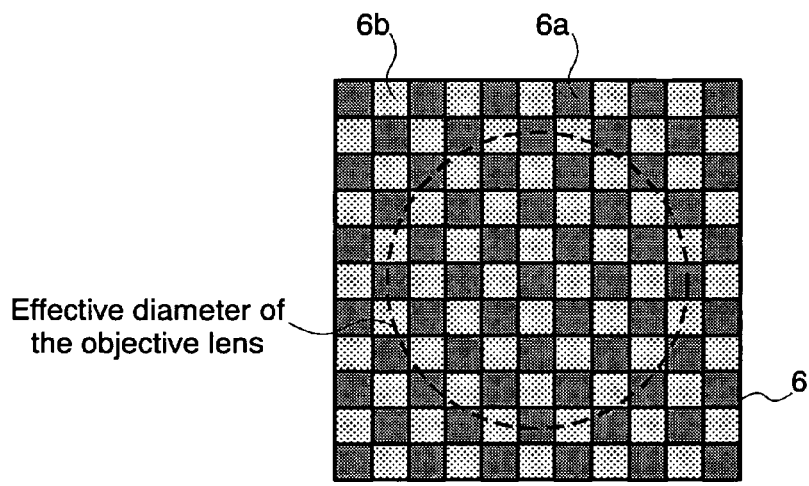
FIG. 10 is a pictorial view of a wave plate pattern in a fifth example.
Figure 11A:
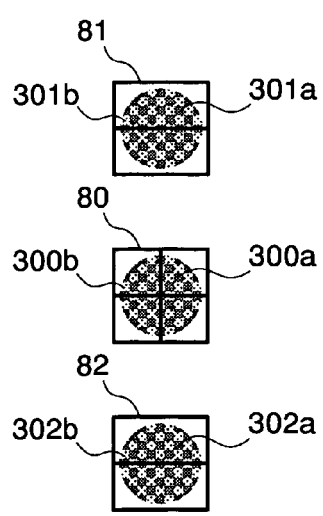
FIG. 11 is a polarization direction distribution pattern in a fifth example formed by a light beam focused on a light-receiving surface.
Figure 11B:
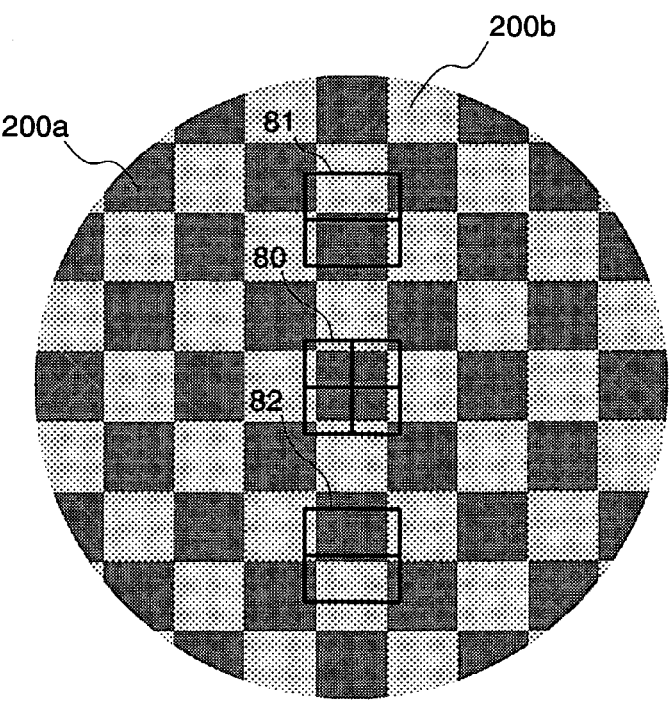

An optical pickup in a fifth embodiment according to the present invention will be described. The optical pickup in the fifth embodiment is provided with a polarization switch 6 having a still lower sensitivity to the performance-deteriorating effect of its horizontal dislocation as compared with the polarization switch 6 employed in the fourth embodiment. The polarization switch has a checkered wave plate pattern as shown in FIG. 10. Although the polarization switch 6 employed in the fifth embodiment, similarly to the polarization switch 6 employed in the fourth embodiment, forms a region in which the respective directions of polarization of the light beams for reproduced signal detection or servo signal detection and the beam acting as a disturbance are perpendicular to each other in a small area as shown in FIGS. 11(a) and 11(b), the polarization switch 6 has a low sensitivity to the performance-deteriorating effect of its both horizontal and vertical dislocations as viewed in FIG. 10.

The size of pattern elements of the checkered wave plate pattern is not limited to that shown in FIG. 10 and the elements of the checkered wave plate pattern may be formed in a smaller size. A checkered wave plate pattern having smaller pattern elements lowers the sensitivity of the polarization switch 6 to the performance-deteriorating effect of its both horizontal and vertical dislocations, as viewed in FIG. 10, still further.

Figure 12:
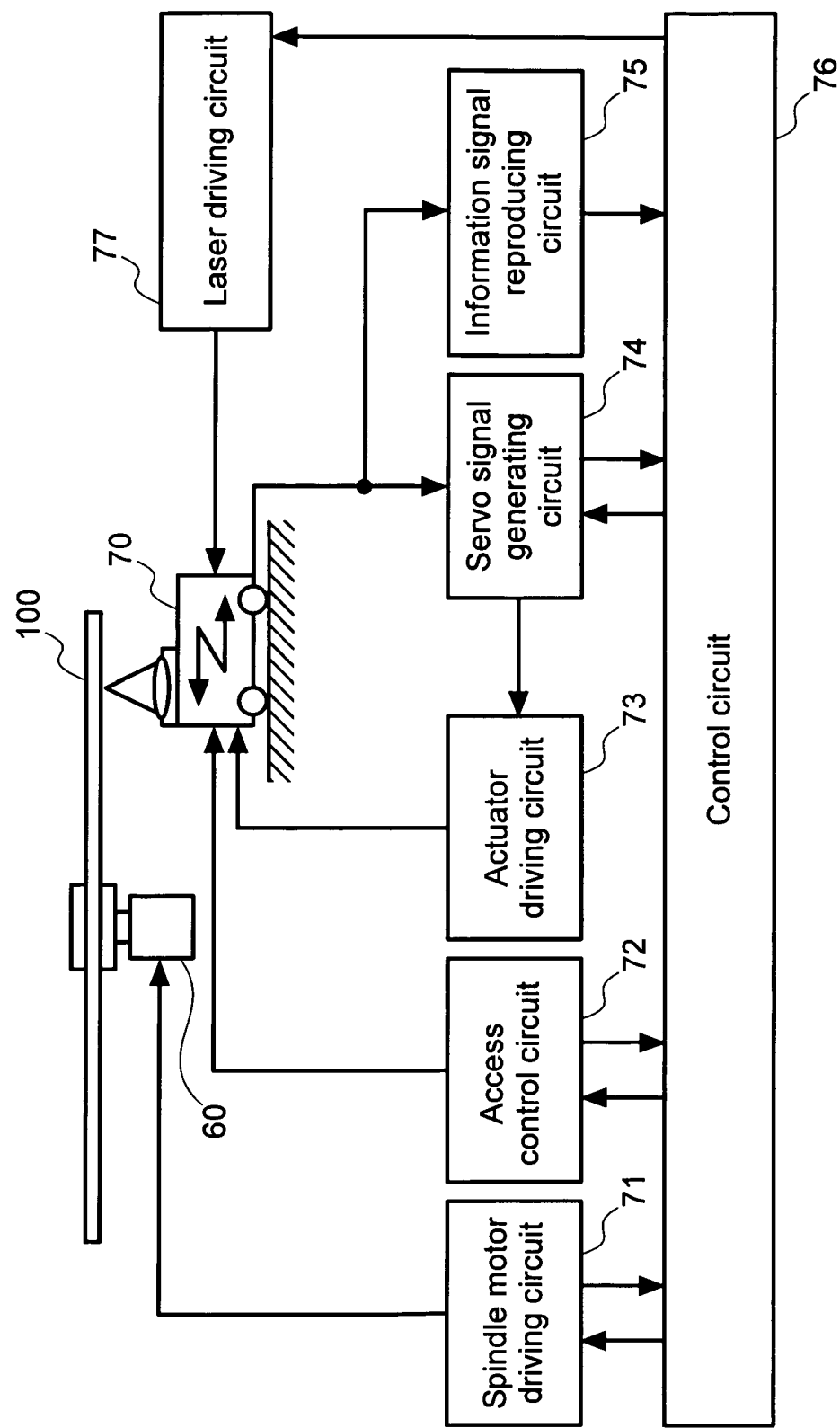
FIG. 12 is a block diagram of an optical disc drive in a preferred embodiment according to the present invention.

FIG. 12 shows an optical disc drive in a preferred embodiment according to the present invention provided with an optical pickup 70 according to the present invention similar to the optical pickup shown in FIG. 1. The optical pickup 70 includes a moving mechanism for moving the optical pickup 70 along a radius of an optical disc 100. The position of the optical pickup 70 is controlled by an access control signal provided by an access control circuit 72. A laser diode driving circuit 77 supplies a laser driving current to a laser diode included in the optical pickup 70. The laser diode emits a laser beam of a predetermined intensity for reproducing and recording. The laser driving circuit 77 may be included in the optical pickup 70.

A detection signal provided by a photo detector included in the optical pickup 70 is given to a servo signal generating circuit 74 and an information signal reproducing circuit 75. The servo signal generating circuit 74 generates a focus error signal and a tracking error signal on the basis of the detection signal. An actuator driving circuit 73 drives an actuator included in the optical pickup 70 according to the focus error signal and the tracking error signal to control the position of the objective lens of the optical pickup 70.

The information signal reproducing circuit 75 reproduces an information signal recorded in the optical disc 100 from the detection signal. Signals generated by the servo signal generating circuit 74 and the information signal reproducing circuit 75 are given to a control circuit 76. The laser driving circuit 77, the access control circuit 72, the actuator driving circuit 73, and a spindle motor control circuit 71 are connected to the control circuit 76. The control circuit 76 executes control operations for controlling the intensity of the laser beam emitted by the diode laser included in the optical pickup 70, for determining an accessing direction and an accessing position and for controlling the operation of the spindle motor 60 for rotating the optical disc 100.

Although the optical pickups in the embodiments according to the present invention and the optical disc drive in the embodiment according to the present invention provided with the optical pickup in the embodiment according to the present invention have been described, the present invention is not limited in its practical application in those embodiments specifically described herein and many changes and variations are possible therein.

For example, although the optical system shown in FIG. 1 is provided with the single laser diode, the optical system may be provided with a plurality of laser diodes respectively capable of emitting laser beams respectively of different wavelengths suitable respectively for reading information from and writing information to different types of discs, such as a BD, DVD and CD when the optical system is used in combination with those different types of discs. When the optical system is provided with a plurality of laser diodes, the optical system may be additionally provided with an optical device for combining the light beams emitted by those laser diodes, such as beam splitter.

Although the light receiving surfaces 80, 81 and 82 shown in each of FIGS. 3, 5, 7, 9 and 11 are divided into four parts, two parts and two parts, respectively, the numbers of divisions is not limited thereto. For example, all the light receiving surfaces 80, 81 and 82 may be divided into four divisions to form the light receiving surface of the detector in twelve parts of three light receiving surfaces each having four parts.

While we have shown and described several embodiments in accordance with our invention, it should be understood that the embodiments disclosed herein are susceptible of changes and modifications without departing from the scope of the invention. Therefore, we do not intend to be bound by the details shown and described herein but intend to cover all such changes and modifications as falling within the ambit of the appended claims.

What is claimed is:

1. An optical pickup which radiate a light beam onto an optical disc provided with a first and a second recording layer and receives the light beam reflected from the optical disc, said optical pickup comprising:
    a laser diode;
    an objective lens for focusing a light beam emitted by the laser diode on the optical disc;
    a detector for detecting the reflected light beam reflected from the optical disc; and
    an orthogonal polarization region forming component which forms an orthogonal polarization region, in which respective directions of polarization of a first light beam focused on and reflected by the first recording layer in the optical disc and a second light beam having a substantially identical wavelength as the first beam and reflected by the second recording layer before or after the first light beam is focused on the first recording layer are perpendicular to each other at the same time, in a region, in which the first and the second light beam overlap each other, on a light-receiving surface of the detector, wherein the orthogonal polarization region forming component is disposed in an optical path between the optical disc and the detector.

2. The optical pickup according to claim 1, wherein the orthogonal polarization region forming component is a polarization switch for changing the directions of polarization of part or all of the first and the second light beam, the polarization switch is placed in an optical path between the objective lens and the detector, and the respective directions of polarization of the first and the second light beam are perpendicular to each other in a predetermined region on the light receiving surface of the detector on which the first and the second light beam passed through the polarization switch overlap each other.

3. The optical pickup according to claim 2, wherein all or part of a region in the polarization switch is a wave plate.

4. The optical pickup according to claim 3, wherein the wave plate is a half-wave plate that causes a phase difference of $\lambda/2$, where $\lambda$ is the wavelength of the light beam emitted by the laser diode.

5. The optical pickup according to claim 3 or 4, wherein the polarization switch is a wave plate provided with a predetermined pattern, and the predetermined pattern is a rectangular pattern.

6. An optical disc drive comprising:
    the optical pickup according to claim 5;
    a laser diode driving circuit for driving the laser diode;
    a servo signal generating circuit for generating at least either of a focusing error signal and a tracking error signal by using a signal produced by the detector included in the optical pickup; and
    an information signal reproducing circuit for reproducing information signals recorded in an optical disc.

7. The optical pickup according to claim 3 or 4, wherein the polarization switch is a wave plate provided with a predetermined pattern, and the predetermined pattern is a striped pattern.

8. An optical disc drive comprising:
    the optical pickup according to claim 7;
    a laser diode driving circuit for driving the laser diode;
    a servo signal generating circuit for generating at least either of a focusing error signal and a tracking error signal by using a signal produced by the detector included in the optical pickup; and
    an information signal reproducing circuit for reproducing information signals recorded in an optical disc.

9. The optical pickup according to claim 3 or 4, wherein the polarization switch is a wave plate provided with a predetermined pattern, and the predetermined pattern is a checkered pattern.

10. An optical disc drive comprising:
    the optical pickup according to claim 9;
    a laser diode driving circuit for driving the laser diode;
    a servo signal generating circuit for generating at least either of a focusing error signal and a tracking error signal by using a signal produced by the detector included in the optical pickup; and
    an information signal reproducing circuit for reproducing information signals recorded in an optical disc.

11. An optical disc drive comprising:
    the optical pickup according to claim 4;
    a laser diode driving circuit for driving the laser diode;
    a servo signal generating circuit for generating at least either of a focusing error signal and a tracking error signal by using a signal produced by the detector included in the optical pickup; and
    an information signal reproducing circuit for reproducing information signals recorded in an optical disc.

12. An optical disc drive comprising:
    the optical pickup according to claim 3;

a laser diode driving circuit for driving the laser diode;

a servo signal generating circuit for generating at least either of a focusing error signal and a tracking error signal by using a signal produced by the detector included in the optical pickup; and an information signal reproducing circuit for reproducing information signals recorded in an optical disc.

13. An optical disc drive comprising:

the optical pickup according to claim 2;

a laser diode driving circuit for driving the laser diode;

a servo signal generating circuit for generating at least either of a focusing error signal and a tracking error signal by using a signal produced by the detector included in the optical pickup; and an information signal reproducing circuit for reproducing information signals recorded in an optical disc.

14. An optical disc drive comprising:

the optical pickup according to claim 1;

a laser diode driving circuit for driving the laser diode;

a servo signal generating circuit for generating at least either of a focusing error signal and a tracking error signal by using a signal produced by the detector included in the optical pickup; and an information signal reproducing circuit for reproducing information signals recorded in an optical disc.

* * * * *